United States Patent
Takeda et al.

(10) Patent No.: US 8,180,542 B2
(45) Date of Patent: May 15, 2012

(54) VEHICLE SPEED CONTROL SYSTEM

(75) Inventors: Masayoshi Takeda, Kariya (JP); Kazunori Kadowaki, Nagoya (JP); Shintaro Osaki, Nisshin (JP); Syotarou Fukuda, Obu (JP); Yasuhiro Nakai, Kariya (JP); Satoshi Niwa, Nagoya (JP); Hajime Kumabe, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 907 days.

(21) Appl. No.: 12/146,045

(22) Filed: Jun. 25, 2008

(65) Prior Publication Data

US 2009/0005945 A1    Jan. 1, 2009

(30) Foreign Application Priority Data

Jun. 27, 2007  (JP) ................. 2007-169483

(51) Int. Cl.
G08G 1/16 (2006.01)
B60K 31/00 (2006.01)
(52) U.S. Cl. ......................................... 701/70
(58) Field of Classification Search .............. 701/70, 701/72; 180/170
See application file for complete search history.

(56) References Cited

U.S. PATENT DOCUMENTS

| | | | |
|---|---|---|---|
| 6,208,926 B1 * | 3/2001 | Wagner et al. | 701/70 |
| 7,243,014 B2 * | 7/2007 | Takamatsu et al. | 701/48 |
| 7,715,971 B2 * | 5/2010 | Okuda et al. | 701/93 |
| 2010/0082216 A1 * | 4/2010 | Yasui et al. | 701/93 |

FOREIGN PATENT DOCUMENTS

| | | |
|---|---|---|
| JP | 06-036187 A | 2/1994 |
| JP | 10-269498 A | 10/1998 |
| JP | 2004-364437 A | 12/2004 |
| JP | 2005-135178 A | 5/2005 |
| JP | 2006-035951 A | 2/2006 |

OTHER PUBLICATIONS

Japanese Notice of Official Rejection dated Mar. 13, 2012 issued in the corresponding Japanese Patent Application No. 2007-169483 and English-language translation.

* cited by examiner

*Primary Examiner* — Kevin Hurley
(74) *Attorney, Agent, or Firm* — Buchanan Ingersoll & Rooney PC (57) ABSTRACT

A vehicle speed control system starts an automatic decelerating operation with a maximum permissible decelerating physical amount "$G_{max}$", when an electronic control unit determines that a necessary decelerating physical amount for decreasing a vehicle speed "v" to a target vehicle speed "$v_t$" at a curve starting point becomes larger than the maximum permissible decelerating physical amount "$G_{max}$". The vehicle speed control system terminates the automatic decelerating operation, when required decelerating physical amount by a braking operation during the automatic decelerating operation becomes larger than an actual control decelerating physical amount for the automatic decelerating operation. The electronic control unit calculates the necessary decelerating physical amount "$G_{ref}$" based on a distance "d" to the curve starting point and the vehicle speed "v", in order to re-start an automatic decelerating operation with the decelerating physical amount "$G_{ref}$", when the required decelerating physical amount becomes lower than the decelerating physical amount "$G_{ref}$".

7 Claims, 9 Drawing Sheets

START OF BRAKING OPERATION

VEHICLE SPEED CONTROL SYSTEM

CROSS REFERENCE TO RELATED APPLICATION

This application is based on Japanese Patent Application No. 2007-169483 filed on Jun. 27, 2007, the disclosure of which is incorporated herein by reference.

FIELD OF THE INVENTION

The present invention relates to a vehicle speed control system, according to which vehicle speed is automatically reduced.

BACKGROUND OF THE INVENTION

A vehicle speed control system is conventionally known in the art, in which vehicle speed is automatically reduced when vehicle deceleration is necessary.

According to the conventional system of this kind, for example, as disclosed in Japanese Patent Publication No. 1994-36187, a curve approaching speed "$v_t$" is calculated based on geographical information from a vehicle navigation system in order that a vehicle can safely pass through a curve ahead thereof, and vehicle speed "v" is automatically decreased to such calculated curve approaching speed "$v_t$". More exactly, deceleration, which is necessary for constantly (at a constant deceleration) reducing the vehicle speed "v" at a curve starting point to the curve approaching speed "$v_t$", is calculated based on a distance "d" to the curve starting point and the current vehicle speed "v". When the calculated deceleration exceeds a predetermined maximum permissible deceleration "$G_{max}$", the vehicle is automatically controlled in such a manner that the vehicle is decelerated at such maximum permissible deceleration "$G_{max}$".

According to another vehicle speed control system, as disclosed in Japanese Patent Publication No. 1998-269498, maximum permissible deceleration "$G_{max}$" is changed depending on a vehicle driver's intention (driving ability).

Figure 8:
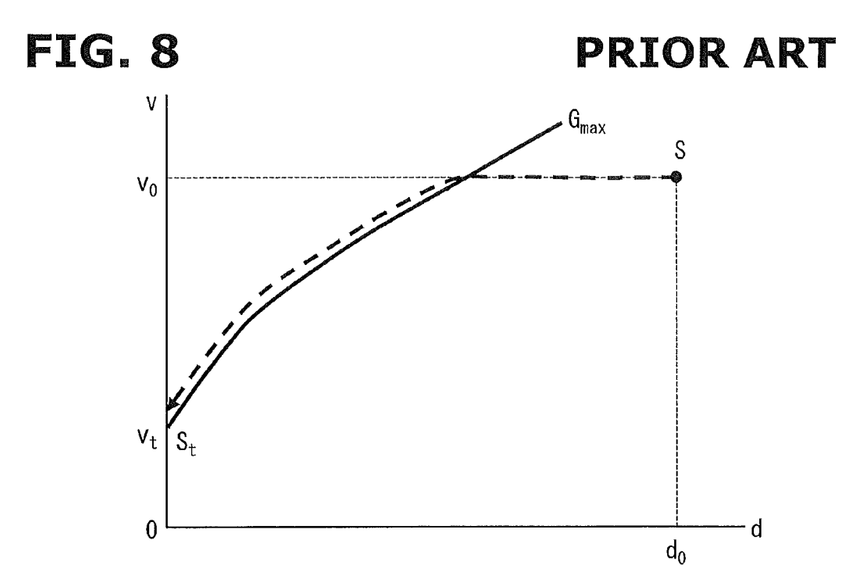
FIG. 8 is an explanatory drawing showing changes of vehicle condition, when an automatic decelerating operation is carried out in a conventional vehicle speed control system.

According to the above conventional vehicle speed control system, as shown in FIG. 8, an automatic decelerating operation is started, when a vehicle approaches a curved road at a constant vehicle speed "$v_0$" from its initial condition S($d_0$, $v_0$), and when the vehicle condition reaches a "$G_{max}$" curve (namely, when the vehicle condition crosses the "$G_{max}$" curve from a right side of the curve). As a result, the vehicle speed "v" is reduced along the "$G_{max}$" curve, so that the vehicle speed "v" becomes to a curve approaching speed "$v_t$" when the vehicle comes to a curve starting point (d=0). This is a vehicle condition "$S_t$".

According to the above conventional system, however, an operation for the following case is not taken into consideration. Namely, it is the case, in which a braking operation is carried out by a vehicle driver during the automatic decelerating operation, and the deceleration required by such braking operation of the vehicle driver is larger than the maximum permissible deceleration "$G_{max}$" (namely, the brake override occurs).

In the case that the brake override occurs, it may be considered to cancel the automatic decelerating operation, as in a similar manner to a conventional cruise control operation. In such a case, however, the automatic decelerating operation must be carried out again, when the vehicle deceleration by the braking operation of the vehicle driver is not sufficient after the cancellation of the automatic decelerating operation. This kind of operation is not disclosed in the above conventional system. Accordingly, the present invention has an object to provide a vehicle speed control system, according to which a smooth vehicle deceleration is realized even in the case the brake override occurs.

Figure 9A:
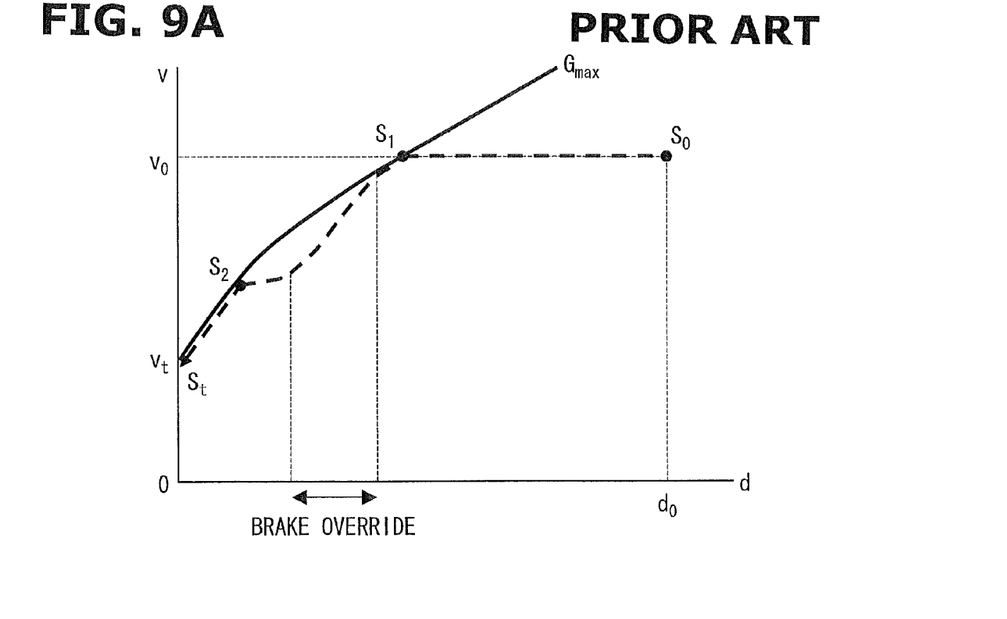
FIGS. 9A and 9B are explanatory drawings showing changes of vehicle condition and torque amount, when the brake override occurs during the automatic decelerating operation in the conventional vehicle speed control system.

More exactly, as indicated by a dotted line in FIG. 9A, if the brake override occurs after the automatic decelerating operation at the maximum permissible deceleration "$G_{max}$" has started at the vehicle condition "$S_1$" (in which the vehicle is decelerated along the "$G_{max}$" curve), condition for the automatic decelerating operation drops out (the vehicle deceleration is departed from the "$G_{max}$" curve). However, when the vehicle deceleration by the braking operation of the vehicle driver is not sufficient, the vehicle condition reaches again the "$G_{max}$" curve at the vehicle condition "$S_2$". As a result, the automatic decelerating operation at the maximum permissible deceleration "$G_{max}$" is carried out again.

Figure 9B:
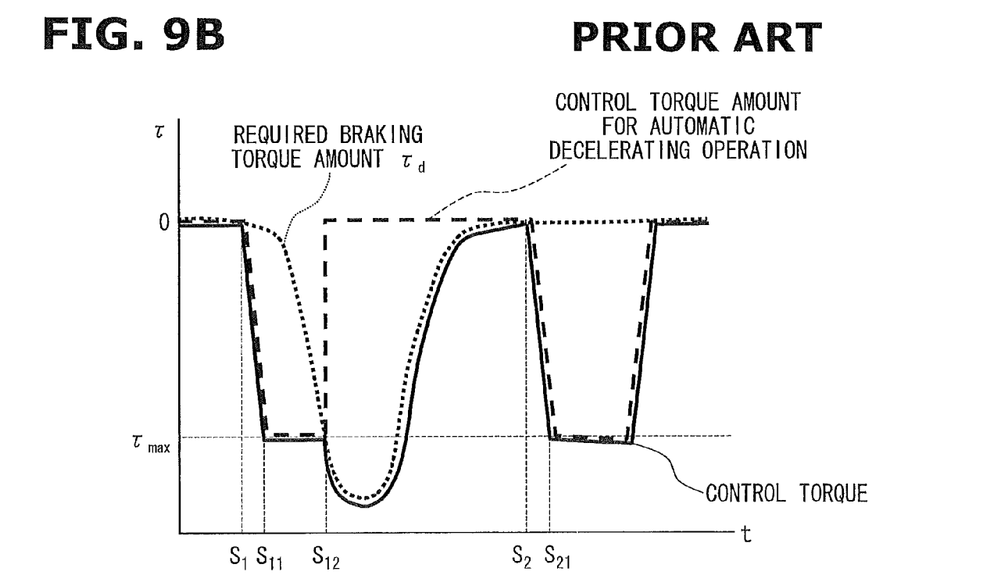

A control torque changes as indicated by a solid line in FIG. 9B during the above operation of the vehicle deceleration. Namely, when the automatic decelerating operation is started at the vehicle condition "$S_1$", the control torque is controlled at a constant torque amount "$\tau_{max}$" which corresponds to the maximum permissible deceleration "$G_{max}$" (the vehicle condition is "$S_{11}$"). When a braking torque amount "$\tau_d$" (indicated by a dotted line) required by the braking operation of the vehicle driver becomes larger than the constant torque amount "$\tau_{max}$" (indicated by a dotted thin line) for the automatic decelerating operation, namely, when the brake override occurs at a vehicle condition "$S_{12}$", the automatic decelerating operation is cancelled, wherein the torque amount by the automatic decelerating operation becomes zero (as indicated by a one-dot chain line). Instead, the required braking torque amount "$\tau_d$" is used as the control torque. When the required braking torque amount "$\tau_d$" is thereafter decreased as a result that the braking force (i.e. brake pedal stepping force) by the vehicle driver is made smaller, and thereby when the vehicle condition reaches again the "$G_{max}$" curve, as shown in FIG. 9A (vehicle condition "$S_2$"), the automatic decelerating operation is started again. Namely, as indicated by the one-dot-chain line in FIG. 9B, the torque amount is again controlled at the torque amount "$\tau_{max}$" (at a vehicle condition "$S_{21}$"). As above, in the case that the vehicle is not sufficiently decelerated by the braking force of the vehicle driver after the vehicle override has occurred, the vehicle deceleration (the control torque) for the automatic operation changes intermittently and largely. As a result, it may cause a problem that an uncomfortable feeling (a large deceleration) is possibly given to the vehicle driver, even though the vehicle driver does not strongly step the brake pedal.

SUMMARY OF THE INVENTION

The present invention is, therefore, made in view of the foregoing problem, and has an object to provide a vehicle speed control system, according to which a smooth vehicle deceleration, which would not give the uncomfortable feeling to the vehicle driver, is realized even in the case the brake override occurs.

According to a feature of the present invention, it is possible to carry out an automatic decelerating operation which would not give uncomfortable feeling to a vehicle driver, even in the case that a brake override occurs during the automatic decelerating operation. According to the feature of the invention, the vehicle speed control system calculates a control decelerating physical amount, which is necessary for decreasing vehicle speed at a deceleration starting point to a target vehicle speed, based on a distance to the deceleration starting point and the vehicle speed. The vehicle speed control system terminates the automatic decelerating operation, when required decelerating physical amount required by a braking operation carried out during the automatic decelerating operation becomes larger than the decelerating physical amount for the automatic decelerating operation. And the vehicle speed control system starts an automatic decelerating operation with the control decelerating physical amount, when the required decelerating physical amount becomes lower than the control decelerating physical amount.

According to the above structure and operation, the automatic decelerating operation with the control decelerating physical amount will be re-started when the required decelerating physical amount becomes lower than the control decelerating physical amount, even in the case that the vehicle deceleration by the braking operation is not sufficiently large after the required decelerating physical amount has become larger than the control decelerating physical amount (after the brake override has occurred). Accordingly, when compared with a system, in which an automatic decelerating operation will not be re-started until decelerating physical amount necessary for decreasing vehicle speed at a deceleration starting point to a target vehicle speed becomes larger than a permissible decelerating physical amount, the automatic decelerating operation can be re-started at an earlier timing according to the invention. Accordingly, the vehicle can be smoothly decelerated. As a result, variation of the decelerating physical amount after the brake override can be suppressed to a smaller amount, so that uncomfortable feeling may not be given to a vehicle driver.

According to another feature of the invention, the vehicle speed control system periodically calculates, at a predetermined interval, a control decelerating physical amount, which is necessary for decreasing vehicle speed at a deceleration starting point to a target vehicle speed. The vehicle speed control system terminates the automatic decelerating operation, when required decelerating physical amount required by a braking operation carried out during the automatic decelerating operation becomes larger than the decelerating physical amount for the automatic decelerating operation. Thereafter, the required decelerating physical amount is continuously compared with the control decelerating physical amount periodically calculated. The vehicle speed control system re-starts an automatic decelerating operation with such control decelerating physical amount, which is calculated at a timing at which the required decelerating physical amount becomes lower than the control decelerating physical amount. With such structure and operation, the vehicle can be also smoothly decelerated.

The automatic decelerating operation will be further carried out, in the case that a braking operation is performed before such automatic decelerating operation but the braking operation is weakened without carrying out a sufficient vehicle deceleration. In such a case, the vehicle deceleration (decelerating physical amount) is intermittently and largely changed, which may give uncomfortable feeling to the vehicle driver.

According to a further feature of the invention, therefore, the vehicle speed control system starts the automatic decelerating operation with the control decelerating physical amount, when the required decelerating physical amount required by the braking operation carried out before the automatic decelerating operation becomes lower than the control decelerating physical amount calculated by a calculating portion, after the required decelerating physical amount has once become larger than the control decelerating physical amount, subject to a condition that the vehicle exists at a position close to the deceleration starting point.

Namely, the decelerating operation is carried out so as to maintain a decelerating vehicle condition achieved by the braking operation, even before starting the automatic decelerating operation. As a result, the vehicle speed can be smoothly decreased to the target vehicle speed.

The decelerating physical amount may be rapidly increased in spite of a weak braking operation, when the automatic decelerating operation with the control decelerating physical amount is started in a condition that the required decelerating physical amount required by the braking operation is smaller than the control decelerating physical amount (weak decelerating physical amount). Therefore, the uncomfortable feeling may be applied to the vehicle driver.

Due to this reason, the automatic decelerating operation is started, when the required decelerating physical amount becomes lower than the control decelerating physical amount, after the required decelerating physical amount has once become larger than the control decelerating physical amount. As a result, the variation of the decelerating physical amount becomes smoother in order not to give the uncomfortable feeling to the vehicle driver.

Furthermore, it is not preferable to start the automatic decelerating operation, in spite that the vehicle is not close to the deceleration starting point. Therefore, the above automatic decelerating operation is carried out, subject to a condition that the vehicle is existing at a position close to the deceleration starting point.

For example, the vehicle speed control system determines that the vehicle exists at the position close to the deceleration starting point in the case that a distance is within a predetermined threshold value, wherein the distance corresponds to a distance of the vehicle to the deceleration starting point when the required decelerating physical amount becomes lower than the control decelerating physical amount.

Alternatively, the vehicle speed control system may determine that the vehicle exists at the position close to the deceleration starting point in the case that a time is within a predetermined threshold value, wherein the time corresponds to a time necessary for the vehicle to increase the control decelerating physical amount above the predetermined permissible decelerating physical amount, if the vehicle traveled at such a vehicle speed at a timing at which the required decelerating physical amount becomes lower than the control decelerating physical amount.

According to a further feature of the invention, a curve starting point of a road, or a point of a road at which a speed limit is changed to a lower value, may be detected as the deceleration starting point.

According to a still further feature of the invention, the vehicle speed control system starts the automatic decelerating operation to decrease the vehicle speed to the target vehicle speed, when the control system determines that the control decelerating physical amount becomes larger than the predetermined permissible decelerating physical amount, even in the case that the required decelerating physical amount required by the braking operation carried out before the automatic decelerating operation does not become larger than the control decelerating physical amount.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

An embodiment of the present invention will be hereinafter explained with reference to the drawings.

Figure 1:
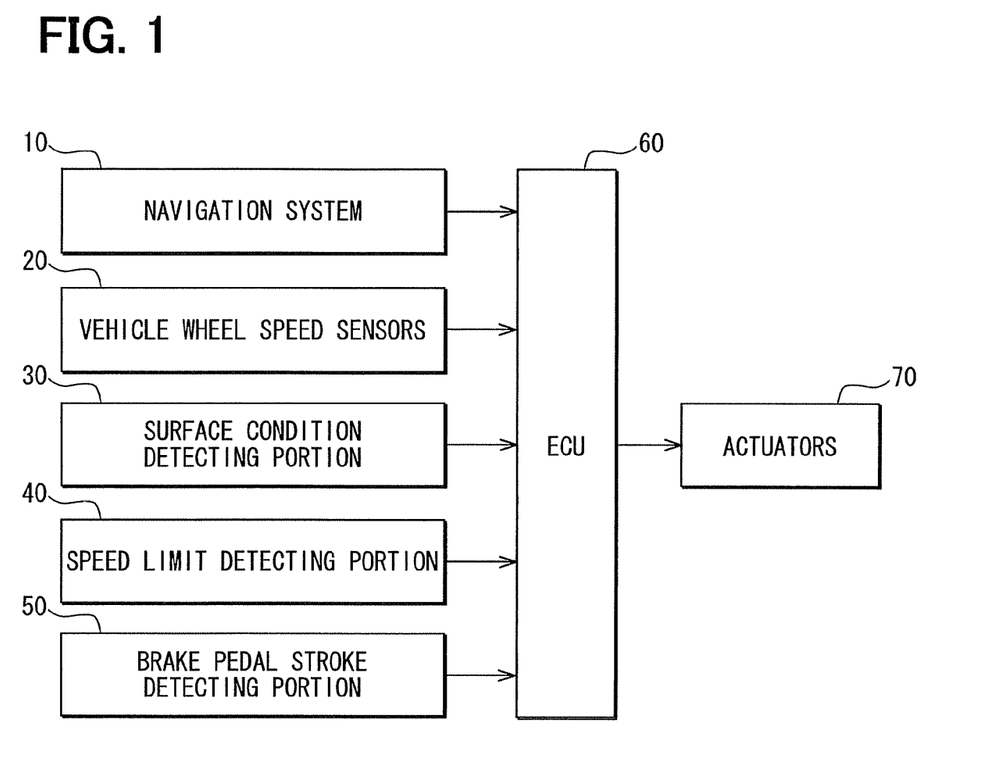
FIG. 1 is a block diagram schematically showing a structure of a vehicle speed control system according to an embodiment of the present invention.

FIG. 1 is a block diagram schematically showing a structure of a vehicle speed control system according to the embodiment of the present invention.

The vehicle speed control system is mounted on a vehicle, which has a navigation system 10, vehicle wheel speed sensors 20, a surface condition detecting portion 30, a speed limit detecting portion 40, a brake pedal stroke detecting portion 50, an ECU (Electronic Control Unit) 60, and actuators 70.

The navigation system 10 calculates a current position of the vehicle on a map, based on a current position of the vehicle detected by a GPS (not shown) and so on and further based on geographical information stored in a memory device (not shown). The navigation system 10 has a function for searching an appropriate route from the current position to a destination and for guiding the route to a vehicle driver. According to the embodiment of the present invention, the navigation system 10 outputs, to the ECU 60, information for a curved road existing ahead of the vehicle, a distance to a curve starting point, a turning radius, and so on.

The vehicle wheel speed sensors 20 detect rotational speed of respective vehicle wheels, based on which vehicle speed is calculated. In other words, the vehicle wheel speed sensors serve as means for detecting a current vehicle speed "v".

The surface condition detecting portion 30 detects a road surface condition (slipping condition) of a road existing ahead of the vehicle. For example, it may have a structure for estimating the surface condition based on a slip ratio of the vehicle wheels, a structure for communicating with devices provided on the roads for the transmission of information in order to obtain information of the surface condition, or a structure for determining the surface condition based on detected information from a temperature sensor, a rain sensor, and other types of sensors.

The speed limit detecting portion 40 detects the speed limit of the current road and/or the road existing ahead of the vehicle. More exactly, it may have a structure for taking a picture of a traffic sign for the speed limit to detect the speed limit information through image data processing, a structure for obtaining the speed limit information from the geographical information of the navigation system 10, a structure for communicating with the devices provided on the roads for the transmission of information in order to obtain the speed limit information, and so on.

The brake pedal stroke detecting portion 50 detects an operational stroke of a brake pedal stepped forward by the vehicle driver. The ECU 60 is an electronic control unit having a micro computer for performing various calculation and processes (FIGS. 6 and 7) for the automatic decelerating operation, as described below.

The actuators 70 control braking forces for the vehicle.

An operation of the vehicle speed control system according to the embodiment of the present invention will be explained.

Figure 2:
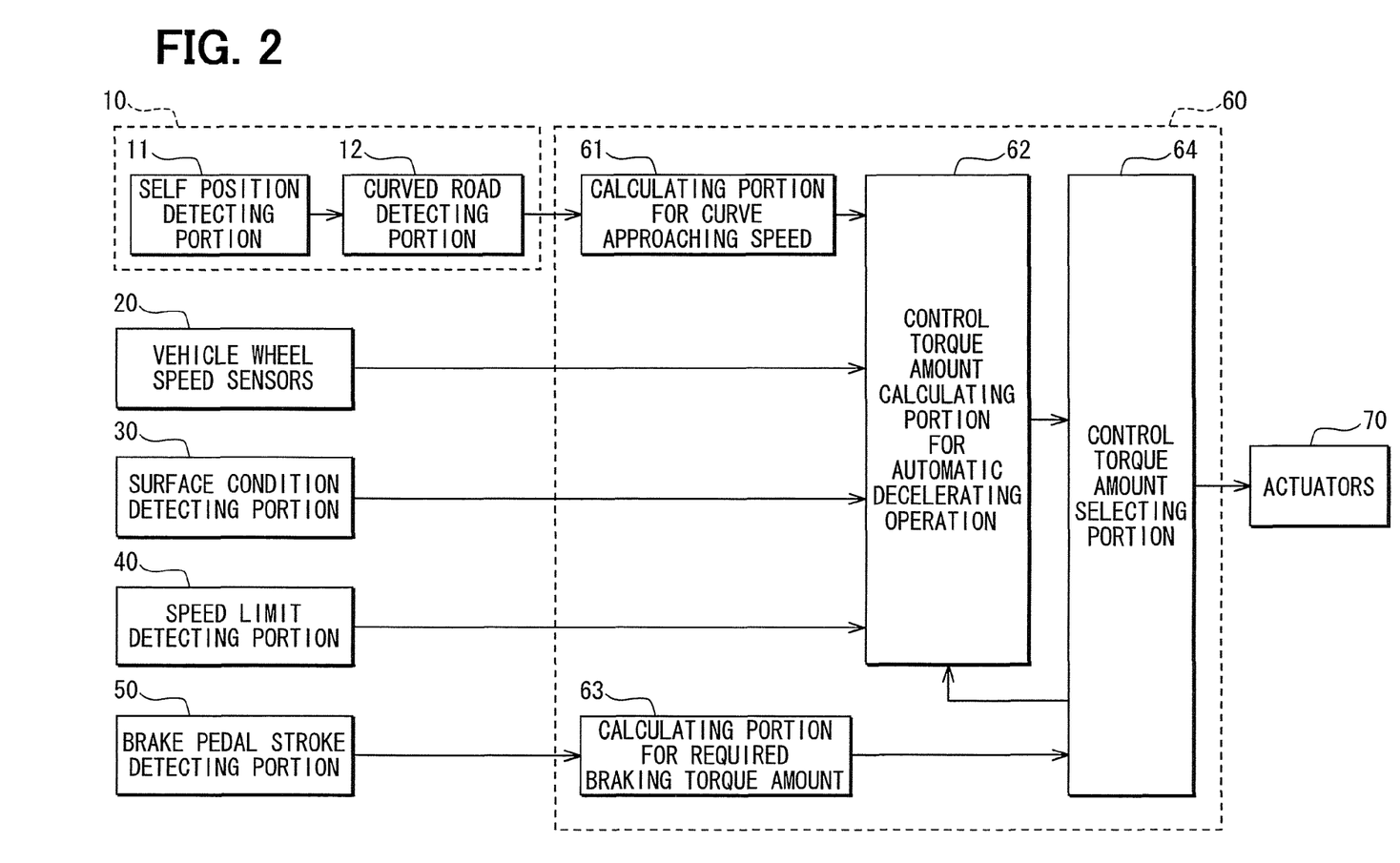
FIG. 2 is a functional block diagram for explaining the structure of the vehicle speed control system.

FIG. 2 is a functional block diagram for explaining the structure of the vehicle speed control system. As shown in FIG. 2, the navigation system 10 functions as a self position detecting portion 11 for detecting the current position of the vehicle, i.e. means for detecting a current vehicle position, and a curved road detecting portion 12 for detecting information of curved roads existing ahead of the vehicle. The ECU 60 functions as a calculating portion 61 for curve approaching speed, a control torque amount calculating portion 62 for the automatic decelerating operation, a calculating portion 63 for the required braking torque amount, and a torque selecting portion 64 for the control torque amount.

The self position detecting portion 11 detects the current position of the vehicle based on a signal from GPS sensor (not shown) and signals from other sensors.

The curved road detecting portion 12 calculates and defines the current position of the vehicle on a map, based on the current position of the vehicle detected by the self position detecting portion 11 as well as the geographical information stored in the memory device. Then, the curved road detecting portion 12 detects the information such as the distance to the curve starting point, the turning radius and so on, as the information for the curved road existing in the vehicle traveling route and ahead of the vehicle.

The calculating portion 61 calculates the curve approaching speed (i.e., a et vehicle speed "$v_t$"), with which the vehicle can safely pass through the curved road, based on the information calculated and detected by the curved road detecting portion 12. More detailed explanation will be made below.

The control torque amount calculating portion 62 calculates the control torque amount for the automatic decelerating operation, based on the curve approaching speed calculated by the calculating portion 61, vehicle speed calculated based on signals from the vehicle wheel speed sensors 20, the road surface condition detected by the surface condition detecting portion 30, and the speed limit detected by the speed limit detecting portion 40. More detailed explanation will be made below.

The calculating portion 63 calculates the required braking torque amount, which corresponds to the operational stroke of the brake pedal stepped forward by the vehicle driver, which is detected by the brake pedal stroke detecting portion 50.

The control torque amount selecting portion 64 selects one of the torque amounts, either the control torque amount for the automatic decelerating operation calculated by the torque amount calculating portion 62 or the required braking torque amount calculated by the calculating portion 63. Then, the actuators 70 carry out the vehicle deceleration at the selected control torque amount.

A process performed by the ECU 60 will be explained.

The ECU 60 carries out the automatic decelerating operation, according to which the vehicle speed "v" is automatically reduced to a target vehicle speed "$v_t$" (i.e. the curve approaching speed "$v_t$"), in the case that there exists a curved road ahead of the vehicle and the actual vehicle speed "v" is larger than the curve approaching speed "$v_t$" with which the vehicle can safely pass through the curved road.

The target vehicle speed "$v_t$" can be calculated in the following formula (1), with the calculating portion 61 serving as means for calculating the target vehicle speed "$v_t$".

$$v_t = \sqrt{G_y * R} \qquad (1)$$

In the above formula (1), "$G_y$" is a permissible lateral acceleration during a vehicle travel on the curved road (i.e. a lateral acceleration with which the vehicle can safely pass through the curved road).

However, in the case that a predetermined amount (e.g. 5 m/s²) fixed as the permissible lateral acceleration is larger than a coefficient "μ" of friction of the road (described below), such coefficient "μ" of friction will be substituted in the above formula (1) as the amount of "$G_y$". In other words, in the case that the coefficient "μ" of friction of the road is smaller (the road is slippery), the coefficient "μ" of friction of the road is used in stead of the permissible lateral acceleration. In this embodiment, the permissible lateral acceleration is explained as the fixed amount. However, the permissible lateral acceleration is not limited to such fixed amount, but it can be changed depending on vehicle traveling circumstances (e.g. bad visual recognition).

Furthermore, in the above formula (1), "R" is a turning radius of the curved road. "*" is a symbol for multiplication.

Figure 3A:
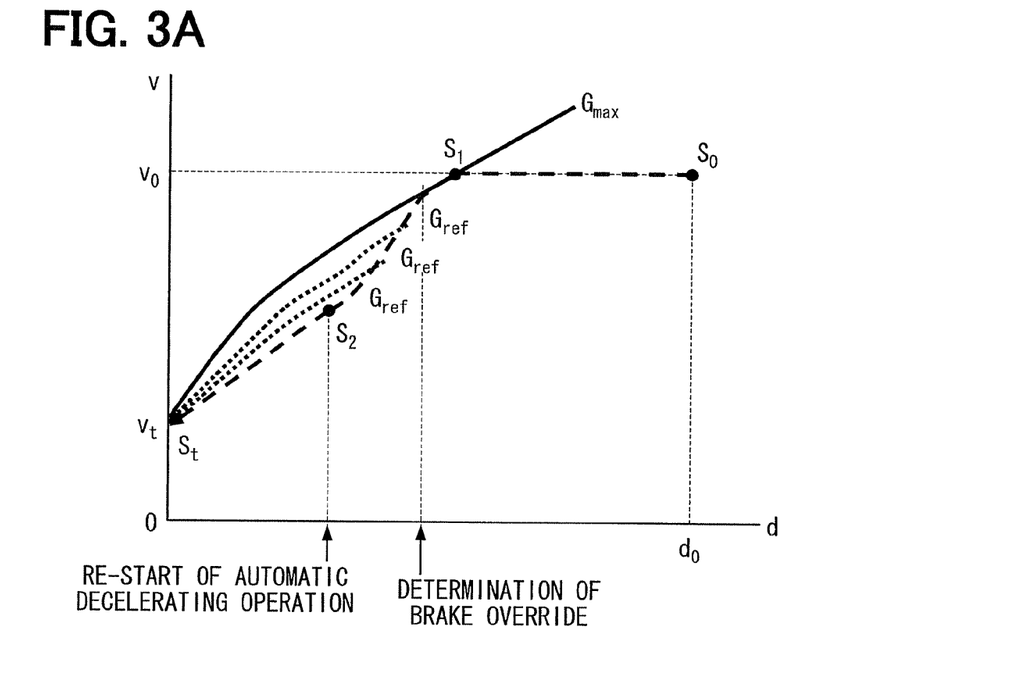
FIGS. 3A and 3B are explanatory drawings showing changes of vehicle condition and torque amount, when a brake override occurs during an automatic decelerating operation.

In the case that the distance from the current position of the vehicle (the self position of the vehicle) to the curve starting point is expressed as "d (d≧0)", a relation between the distance "d" and the vehicle speed "v" can be indicated by a "$G_{max}$" line ("$G_{max}$" curve) in FIG. 3A, wherein the vehicle speed "v" is decreased at a predetermined maximum permissible deceleration "$G_{max}$" (e.g. 6 m/s²) in order that the vehicle speed "v" is reduced to a target speed "$v_t$" at a vehicle position where the distance "d" becomes zero (d=0).

Figure 3B:
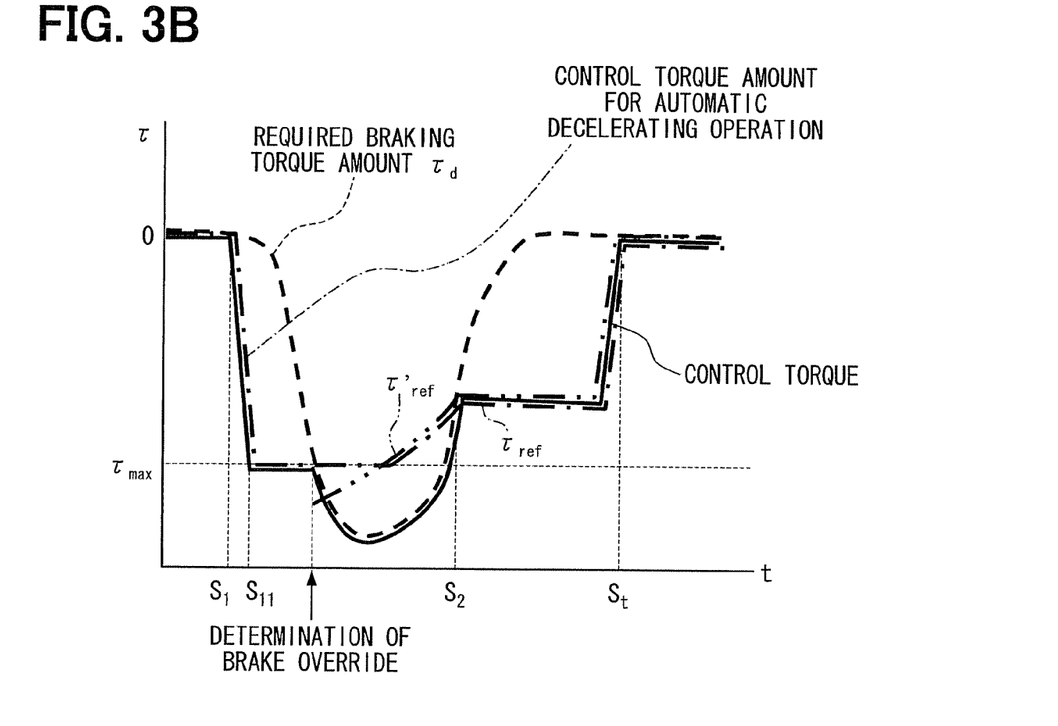

When a vehicle condition "S", which can be expressed by the distance "d" and the vehicle speed "v", comes closer to the "$G_{max}$" line from the right-hand side thereof, namely when the vehicle condition is changed from "$S_0$" to "$S_1$" as a result that the vehicle condition "S" crosses the "$G_{max}$" line, the automatic decelerating operation is started so that the vehicle speed "v" is reduced along the "$G_{max}$" line. More exactly, as shown in FIG. 3B, the control torque (indicated by a solid line) is controlled at a maximum torque amount "$\rho_{max}$" (at a the vehicle condition "$S_{11}$") for the automatic decelerating operation, which corresponds to a torque amount for the maximum permissible deceleration "$G_{max}$".

In the case that a braking operation is carried out by the vehicle driver during the above automatic decelerating operation, the required braking torque amount "$\tau_d$" (indicated by a dotted line) required by such braking operation becomes larger than the maximum torque amount "$\tau_{max}$" for the automatic decelerating operation, namely the brake over ride occurs. In such a case, the automatic decelerating operation at the maximum torque amount "$\tau_{max}$" is terminated. And the vehicle deceleration is continued, wherein the control torque amount is controlled at the required braking torque amount "$\tau_d$".

As a result, as shown in FIG. 3A, the vehicle condition "S" drops out from the "$G_{max}$" line. Namely, the vehicle condition "S" is moved in a downward direction and changed from the vehicle condition "$S_1$" to a vehicle condition "$S_2$".

During this period of the change of the vehicle condition ("$S_1$" to "$S_2$"), the ECU 60 continues to calculate a deceleration amount "$G_{ref}$" by the following formula (2) (i.e. periodically calculates at a predetermined time interval), wherein the deceleration amount "$G_{ref}$" is a necessary deceleration amount for reducing the vehicle speed at a constant deceleration so that the vehicle speed "v" at the vehicle position of "d=0" (the distance "d" is zero) is decreased to the target vehicle speed "$v_t$". In other words, the ECU 60 serves as means for calculating a deceleration amount with which the current vehicle speed "v" will be decreased to the target vehicle speed "$v_t$", based on a distance "d" from the current vehicle position to the deceleration point and the current vehicle speed "$v_t$".

$$G_{ref} = \max\left(\frac{v_t^2 - v^2}{2*d}, -\mu*9.8\right) \qquad (2)$$

In the above formula (2), "μ" is the coefficient of friction of the road, which represents the slipping condition of the road (the value for "μ" becomes smaller as the road becomes more slippery, for example, the road of "μ=0.1" is more slippery than the road of "μ=0.5"). Furthermore, "max" in the above formula (2) means that one of the figures, which is one of figures in parentheses and which is larger than the other, is selected. For example, in the case that the figure before comma is "−3 m/s²" and the figure after the comma is "−1 m/s²=−μ×9.8 m/s²", the deceleration amount "$G_{ref}$" is calculated as "−1 m/s²".

As shown in FIG. 3B, when the required braking torque amount "$\tau_d$" becomes smaller (at the vehicle condition "$S_2$") than a torque amount "$\tau_{ref}$" (which corresponds to a corrected torque amount "$\tau'_{ref}$" indicated by a two-dot-chain line, as described more in detail below) for the automatic decelerating operation corresponding to the calculated deceleration amount "$G_{ref}$", the automatic decelerating operation is started again, wherein the torque amount "$\tau_{ref}$" for the automatic decelerating operation is used as the control torque amount.

In other words, as shown in FIG. 3A, the deceleration amount "$G_{ref}$" (indicated by dotted lines) is repeatedly calculated at a predetermined interval, after the ECU 60 determines the occurrence of the brake override. And when the deceleration amount required by the braking operation of the vehicle driver becomes smaller than such calculated deceleration amount "$G_{ref}$" at the vehicle condition "$S_2$", the automatic decelerating operation is carried out again, wherein the vehicle speed "v" is reduced along a "$G_{ref}$" line (deceleration curve) calculated at such timing point (that is, at the vehicle condition "$S_2$"). As a result, the vehicle can be smoothly decelerated to a vehicle condition "$S_t$", during which the vehicle condition may not come back to such conditions on the "$G_{max}$" line. In other words, the control torque amount may not be increased to the maximum torque amount "$\tau_{max}$" for the automatic decelerating operation.

In the above explained operation, however, a control delay (such as a delay caused by movements of mechanical parts for the actuators 70) may happen during a period from a time point of the vehicle condition "$S_1$" (at which the ECU determines that the vehicle condition has reached at the "$G_{max}$" line) to a time point at which the automatic decelerating operation is actually started. Namely, the automatic decelerating operation is started when the vehicle condition runs off from the "$G_{max}$" line in its left-hand direction (that is a timing shortly after the vehicle condition has reached at the vehicle condition "$S_1$" in FIG. 3A).

In such a case, the deceleration amount "$G_{ref}$" calculated according to the formula (2) becomes a larger deceleration amount than the maximum permissible deceleration "$G_{max}$" (that is, the torque amount "$\tau_{ref}$" for the automatic decelerating operation becomes larger than the maximum torque amount "$\tau_{max}$" for the automatic decelerating operation).

Accordingly, in the embodiment of the present invention, the torque amount "$\tau_{ref}$" for the automatic decelerating operation is not directly used, but the corrected torque amount "$\tau'_{ref}$" for the automatic decelerating operation which is calculated according to the following formula (3) is used, in order that the deceleration amount for the automatic decelerating operation may not become larger than "$G_{max}$" (that is, in order that the control torque amount for the automatic decelerating operation may not become larger than the maximum torque amount "$\tau_{max}$" for the automatic decelerating operation).

$$\tau'_{ref}=\max(\tau_{ref},\tau_{max}) \quad (3)$$

Namely, one of the torque amounts, between the torque amount "$\tau_{ref}$" for the automatic decelerating operation and the maximum torque amount "$\tau_{max}$", whichever larger is, is selected as "$\tau'_{ref}$" In other words, the torque amount, whichever is smaller in the absolute figure and whichever is smaller in the deceleration, is decided as "$\tau'_{ref}$". As a result, the deceleration amount for the automatic decelerating operation is limited, so that the deceleration amount for the automatic decelerating operation may not become larger than "$G_{max}$" (that is, the control torque amount for the automatic decelerating operation may not become larger than the maximum torque amount "$\tau_{max}$" for the automatic decelerating operation).

Figure 4A:
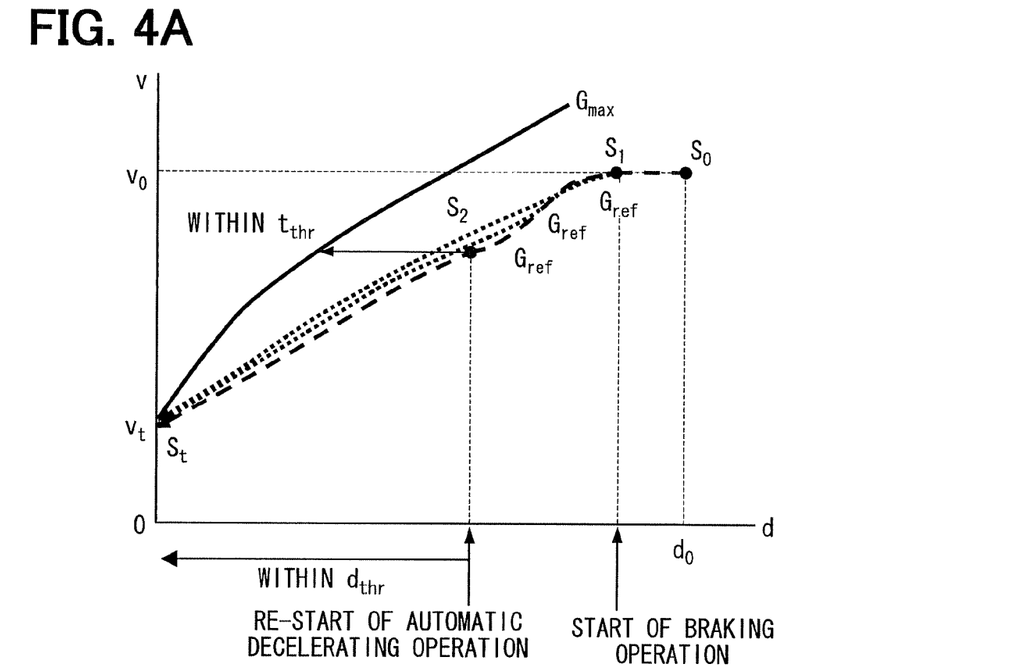
FIGS. 4A and 4B are explanatory drawings showing changes of vehicle condition and torque amount, when a braking operation is carried out by a vehicle driver before starting the automatic decelerating operation.

As shown in FIG. 4A, even in the case that the braking operation is carried out by the vehicle driver at the vehicle condition "$S_1$" before the automatic decelerating operation has not yet started (i.e. before the vehicle condition "S" reaches at the "$G_{max}$" line), the ECU 60 also continues to calculate the deceleration amount "$G_{ref}$", which is necessary for reducing the vehicle speed at the constant deceleration so that the vehicle speed "v" at the vehicle position of "d=0" (the distance "d" is zero) is decreased to the target vehicle speed "$v_t$".

Figure 4B:
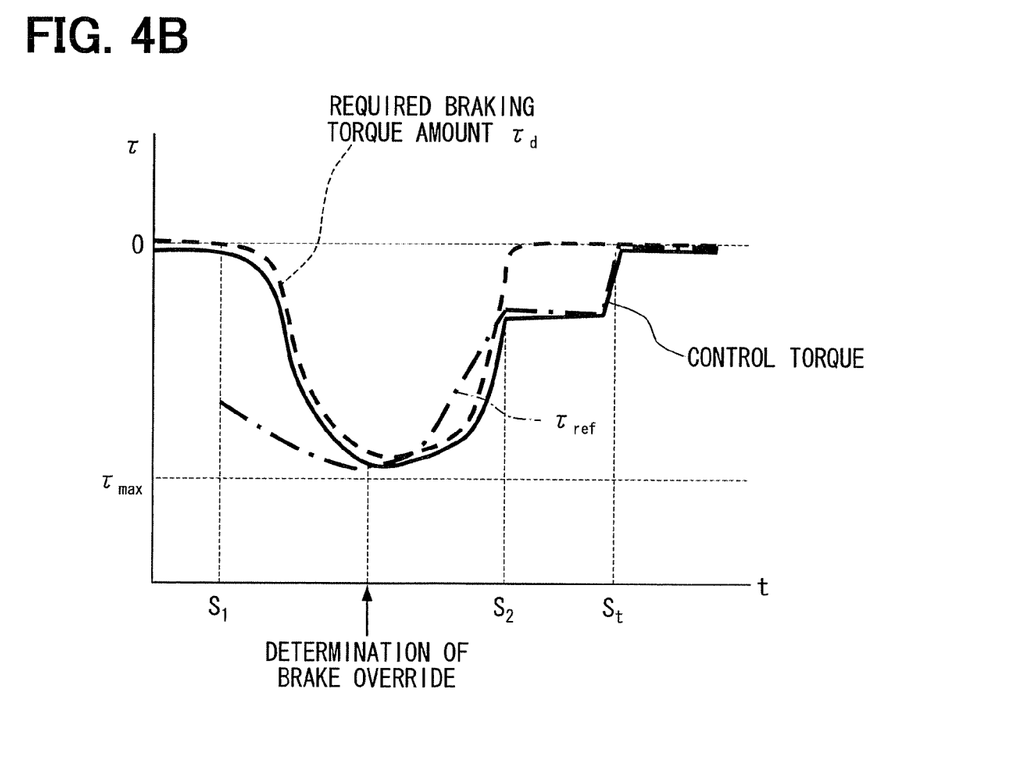

However, as shown in FIG. 4B, the automatic decelerating operation will not be started until the required braking torque amount "$\tau_d$" (indicated by a dotted line) required by the braking operation of the vehicle driver once becomes larger than the torque amount "$\tau_{ref}$" (indicated by a one-dot-chain line) for the automatic decelerating operation (i.e. until the ECU 60 determines the brake override). This is to avoid such a case, in which the vehicle deceleration may give uncomfortable feeling to the vehicle driver, if the vehicle is decelerated with the torque amount "$\tau_{ref}$" for the automatic decelerating operation which is larger than the required braking torque amount "$\tau_d$" required by the braking operation of the vehicle driver.

Then, the ECU 60 starts the automatic decelerating operation, when the required braking torque amount "$\tau_d$" becomes smaller than the torque amount "$\tau_{ref}$" for the automatic decelerating operation at the vehicle condition "$S_2$", however only after the required braking torque amount "$\tau_d$" has once become larger than the torque amount "$\tau_{ref}$" for the automatic decelerating operation. Namely, as shown in FIG. 4A, the deceleration amount "$G_{ref}$" is continuously calculated at the predetermined intervals after the braking operation is carried out by the vehicle driver, and the automatic decelerating operation will be started when the deceleration amount by the braking operation becomes smaller than the calculated deceleration amount "$G_{ref}$" at the vehicle condition "$S_2$", wherein the vehicle speed "v" is reduced along a "$G_{ref}$" line (deceleration curve) calculated at such timing point (that is, at the vehicle condition "$S_2$").

However, the automatic decelerating operation is not started when there is a sufficient distance to the curve starting point. This is to avoid such a case in which the automatic decelerating operation may be started at such an early and unnecessary stage, even in spite that there is sufficient distance to the curve starting point ahead of the vehicle.

More exactly, the automatic decelerating operation is started, at least when one of the following two conditions is satisfied:

<First Condition>

The distance "d" to the curve starting point, when the required braking torque amount "$\tau_d$" becomes smaller than the torque amount "$\tau_{ref}$" for the automatic decelerating operation at the vehicle condition "$S_2$", is smaller than a threshold amount "$d_{thr}$" (e.g. 30 m).

<Second Condition>

A time period from the time point of the vehicle condition "$S_2$" (at which the required braking torque amount "$\tau_d$" becomes smaller than the torque amount "$\tau_{ref}$" for the automatic decelerating operation) to a time point, at which the vehicle condition would reach at the "$G_{max}$" line if the vehicle continued to travel at the vehicle speed "v" at the vehicle condition "$S_2$", is smaller than a threshold amount "$t_{thr}$" (e.g. 2 sec.).

Namely, in the case that either one of the above conditions is satisfied, the ECU 60 determines that the vehicle is coming closer to the curve starting point.

Figure 5A:
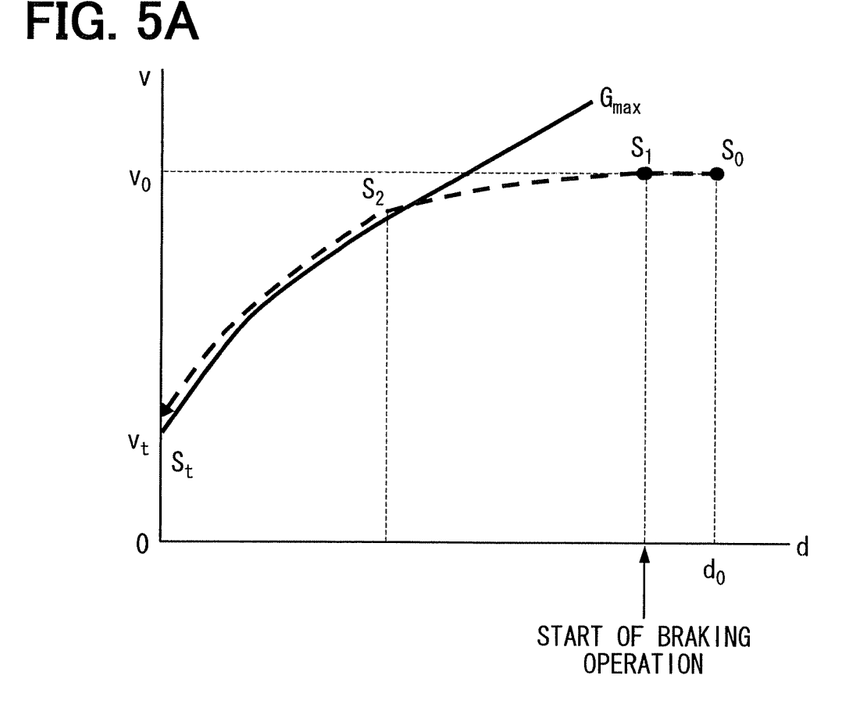
FIGS. 5A and 5B are explanatory drawings showing changes of vehicle condition and torque amount, when vehicle condition reaches a "$G_{max}$" line without having carried out the automatic decelerating operation in the case that the braking operation is carried out by the vehicle driver before starting the automatic decelerating operation.
Figure 5B:
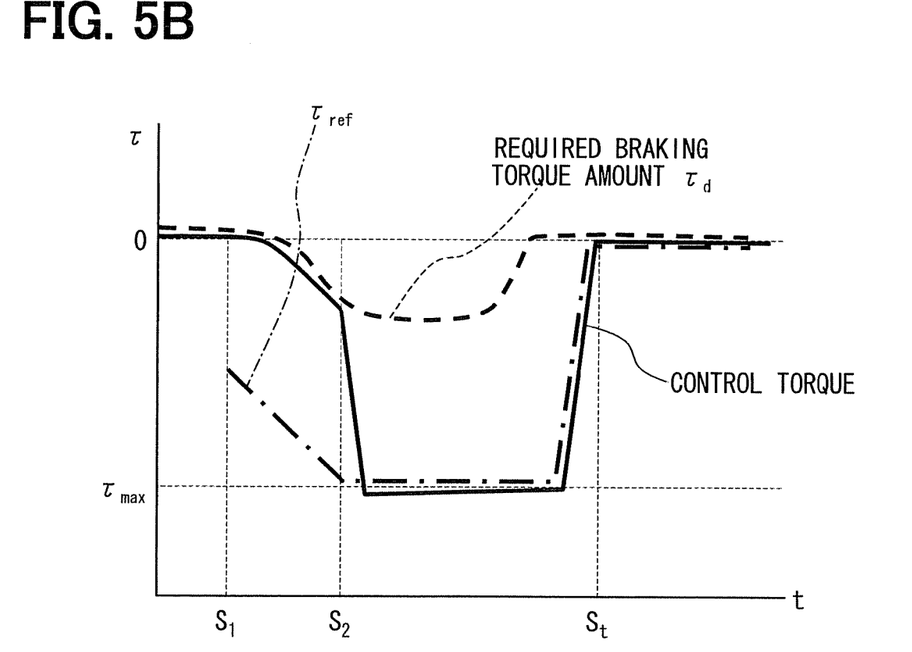

As shown in FIGS. 5A and 5B, the automatic decelerating operation will be started in the following cases, in order that the vehicle speed "v" is reduced along the "$G_{max}$" line:

(1) when the braking operation is carried out by the vehicle driver at the vehicle condition "$S_1$" before the automatic decelerating operation has not yet started (i.e. before the vehicle condition "S" reaches at the "$G_{max}$" line); and (2) when the vehicle condition has reached at the "$G_{max}$" line (the vehicle condition "$S_2$"), wherein the required braking torque amount "$\tau_d$" (indicated by a dotted line) required by the braking operation of the vehicle driver had not become larger than the torque amount "$\tau_{ref}$" (indicated by a one-dot-chain line) for the automatic decelerating operation during a period from the vehicle condition "$S_1$" to the vehicle condition "$S_2$". (That is, the vehicle condition has reached at the "$G_{max}$" without starting the automatic decelerating operation.)

Figure 6:
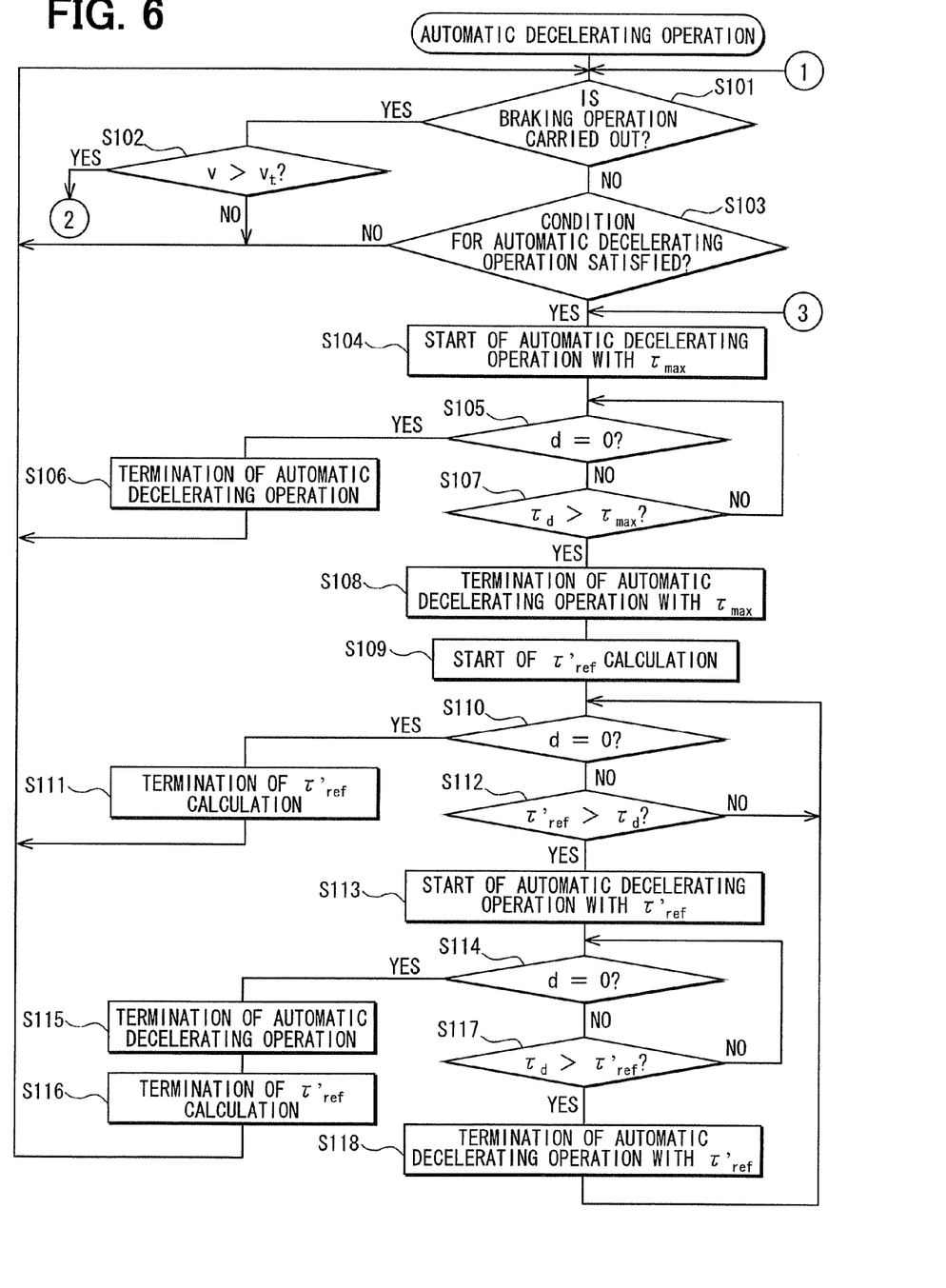
FIG. 6 is a first part (1) of a flow-chart for carrying out the automatic decelerating operation.
Figure 7:
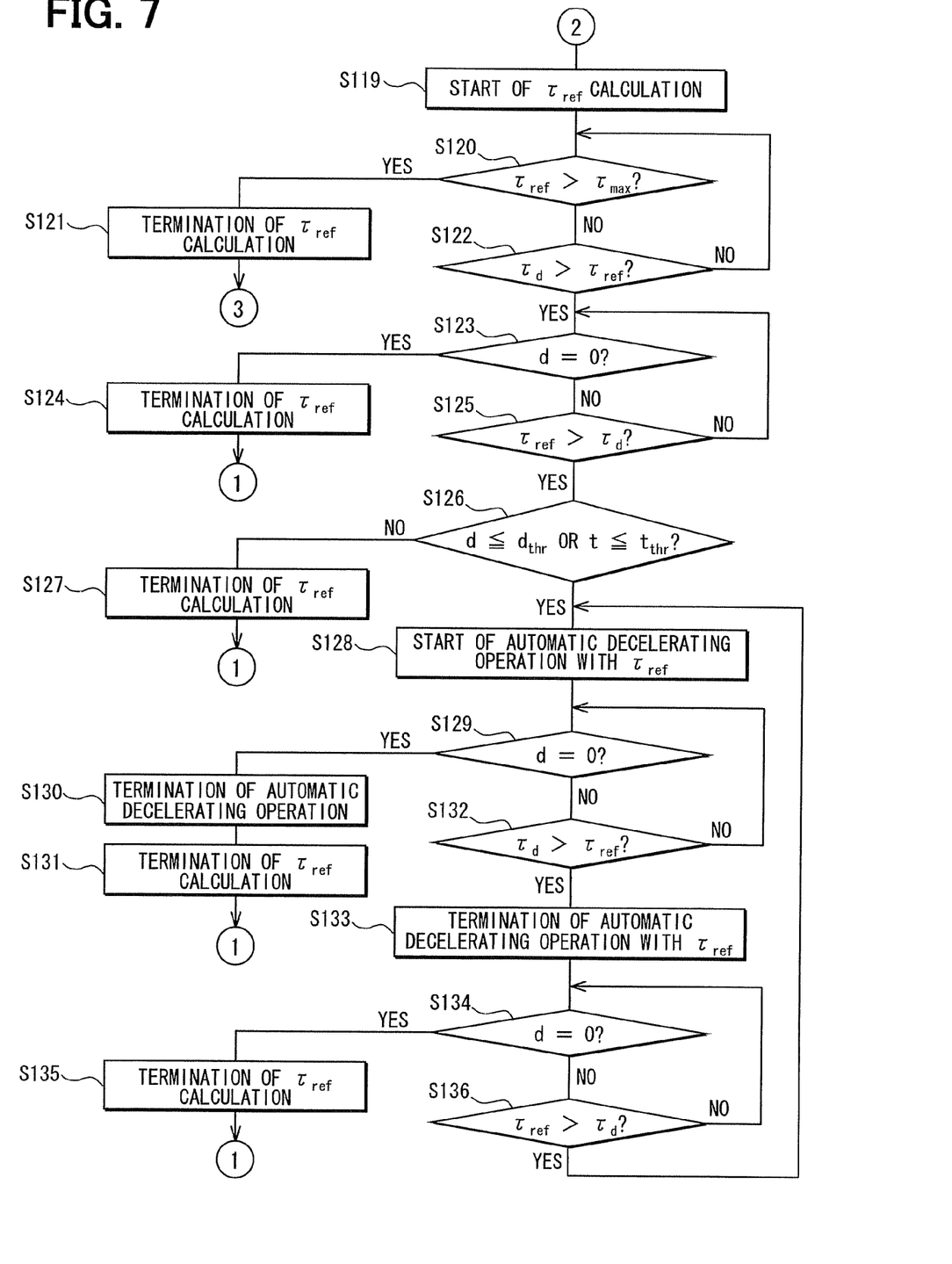
FIG. 7 is a second part (2) of the flow-chart for carrying out the automatic decelerating operation.

The automatic decelerating operation performed by the ECU 60 will be explained with reference to the flowcharts shown in FIGS. 6 and 7. A process for the automatic decelerating operation is started when the vehicle starts to move (the vehicle speed "v>0") and terminated when the vehicle travel stops (the vehicle speed "v=0").

When the process for the automatic decelerating operation has started, the ECU 60 determines, at first, at a step S101 whether the braking operation has been carried out by the vehicle driver or not.

When the ECU 60 determines at the step S101 that the braking operation has been carried out, the process goes to a step S102 at which the ECU 60 determines whether the current vehicle speed "v" is larger than a target vehicle speed "$v_t$", which will be the vehicle speed at the curve starting point existing on the road ahead of the vehicle. In other words, ECU 60 determines whether it is necessary or not to decelerate the vehicle before reaching at the curve starting point.

When the ECU 60 determines at the step S102 that the current vehicle speed "v" is not larger than the target vehicle speed "$v_t$" ($v \leq v_t$), the process returns to the step S101. The process for the case, in which the current vehicle speed "v" is larger than the target vehicle speed "$v_t$" ($v > v_t$), will be explained below.

In the case that the ECU 60 determines at the step S101 that the braking operation has not been carried out, the process goes to a step S103 at which the ECU 60 determines whether conditions for the automatic decelerating operation are satisfied or not. More exactly, the ECU 60 determines that the conditions for the automatic decelerating operation are satisfied, when the vehicle deceleration necessary for decreasing the vehicle speed "v" at the curve starting point to the target vehicle speed "$v_t$" is larger than the maximum permissible deceleration "$G_{max}$" (i.e. when the vehicle condition reaches at the "$G_{max}$" line).

When the ECU 60 determines at the step S103 that the conditions for the automatic decelerating operation are not satisfied, the process returns to the step S101. As above, the above steps S101 to S103 are repeated, so long as the conditions for the automatic decelerating operation are not satisfied and the braking operation is not carried out.

When the ECU 60 determines at the step S103 that the conditions for starting the automatic decelerating operation are satisfied, the process goes to a step S104 at which the automatic decelerating operation is carried out, wherein the automatic decelerating operation is carried out with the maximum torque amount "$\tau_{max}$". As a result, the vehicle speed "v" is decreased along the "$G_{max}$" line (FIGS. 3A and 3B). In carrying out step S104, the ECU 60 serves as means for starting an automatic decelerating operation for the vehicle.

At a step S105, the ECU 60 determines whether the distance "d" to the curve starting point has become zero, namely whether the vehicle has reached at the curve starting point or not.

When the ECU 60 determines at the step S105 that the distance "d" to the curve starting point has become zero, the process goes to a step S106, and then returns to the step S101 after the automatic decelerating operation with the maximum torque amount "$\tau_{max}$" has been finished.

On the other hand, when the ECU 60 determines at the step S105 that the distance "d" to the curve starting point has not yet become zero, the process goes to a step S107 at which the ECU 60 determines whether the required braking torque amount "$\tau_d$" required by the braking operation of the vehicle driver becomes larger than the maximum torque amount "$\tau_{max}$" for the automatic decelerating operation. Namely, the ECU 60 determines whether the brake override has occurred or not.

When the ECU 60 determines at the step S107 that the required braking torque amount "$\tau_d$" is not larger than the maximum torque amount "$\tau_{max}$", the process goes back to the step S105. Namely, the automatic decelerating operation with the maximum torque amount "$\tau_{max}$" is continued until the vehicle reaches at the curve starting point, unless the brake override condition occurs.

On the other hand, when the ECU 60 determines at the step S107 that the required braking torque amount "$\tau_d$" has become larger than the maximum torque amount "$\tau_{max}$", the process goes to a step S108, so that the automatic decelerating operation with the maximum torque amount "$\tau_{max}$" is terminated. In carrying out step S108, the ECU 60 serves as means for terminating the automatic decelerating operation for the vehicle. In other words, the vehicle decelerating operation is changed to such an operation (a normal decelerating operation), in which the vehicle is decelerated with the required braking torque amount "$\tau_d$" required by the braking operation of the vehicle driver.

At a step S109, the ECU 60 starts calculation for the torque amount "$\tau_{ref}$" for the automatic decelerating operation. In carrying out step S109, the ECU 60 serves as means for calculating deceleration control torque amount which corresponds to the deceleration amount. More exactly, the ECU 60 repeatedly calculates the torque amount "$\tau_{ref}$" at a predetermined time interval (e.g. for each 100 msec.).

Then, at a step S110, the ECU 60 determines whether the distance "d" to the curve starting point has become zero, namely whether the vehicle has reached at the curve starting point or not.

When the ECU 60 determines at the step S110 that the distance "d" to the curve starting point has become zero, the process goes to a step S111, and then returns to the step S101 after the calculation for the torque amount "$\tau'_{ref}$" has been finished.

On the other hand, when the ECU 60 determines at the step S110 that the distance "d" to the curve starting point has not yet become zero, the process goes to a step S112 at which the ECU 60 determines whether the calculated torque amount "$\tau'_{ref}$" becomes larger than the required braking torque amount "$\tau_d$" required by the braking operation of the vehicle driver. Namely, the ECU 60 determines whether the brake override condition has been terminated or not.

When the ECU 60 determines at the step S112 that the calculated torque amount "$\tau'_{ref}$" is not larger than the required braking torque amount "$\tau_d$", the process goes back to the step S110.

On the other hand, when the ECU 60 determines at the step S112 that the calculated torque amount "$\tau_{ref}$" is larger than the required braking torque amount "$\tau_d$", the process goes to a step S113, at which the automatic decelerating operation is started with the calculated torque amount "$\tau_{ref}$". In carrying out step S113, the ECU 60 serves as means for starting an automatic decelerating operation with the deceleration control torque amount. As a result, the vehicle speed "v" is decreased along either the "$G_{ref}$" line or the "$G_{max}$" line, whichever is smaller in the vehicle deceleration (FIGS. 3A and 3B).

Then, at a step S114, the ECU 60 determines again whether the distance "d" to the curve starting point has become zero, namely whether the vehicle has reached at the curve starting point or not.

When the ECU 60 determines at the step S114 that the distance "d" to the curve starting point has become zero, the process goes to a step S115 at which the automatic decelerating operation with the torque amount "$\tau'_{ref}$" is terminated. And the process returns to the step S101 after the calculation for the torque amount "$\tau'_{ref}$" has been finished at a step S116.

On the other hand, when the ECU 60 determines at the step S114 that the distance "d" to the curve starting point has not yet become zero, the process goes to a step S117, at which the ECU 60 determines whether the required braking torque amount "$\tau_d$" required by the braking operation of the vehicle driver becomes larger than the calculated torque amount "$\tau'_{ref}$" for the automatic decelerating operation. Namely, the ECU 60 determines whether the brake override condition has started or not.

When the ECU 60 determines at the step S117 that the required braking torque amount "$\tau_d$" is not larger than the calculated torque amount "$\tau'_{ref}$", the process goes back to the step S114. Namely, the automatic decelerating operation with the calculated torque amount "$\tau'_{ref}$" is continued until the vehicle reaches at the curve starting point, unless the brake override condition occurs.

On the other hand, when the ECU 60 determines at the step S117 that the required braking torque amount "$\tau_d$" has become larger than the calculated torque amount "$\tau'_{ref}$", the process goes to a step S118, so that the automatic decelerating operation with the torque amount "$\tau'_{ref}$" is terminated. Then, the process goes back to the process $S_{110}$. Accordingly, the vehicle decelerating operation is changed to the operation (the normal decelerating operation), in which the vehicle is decelerated with the required braking torque amount "$\tau_d$" required by the braking operation of the vehicle driver.

When the ECU 60 determines at the step S102 that the current vehicle speed "v" is larger than the target vehicle speed "$v_t$", the process goes to a step S119, in order to start the calculation for the torque amount "$\tau_{ref}$" for the automatic decelerating operation. More exactly, the ECU 60 repeatedly calculates the torque amount "$\tau_{ref}$" at the predetermined time interval (e.g. for each 100 msec.).

At a step S120, the ECU 60 determines whether the calculated torque amount "$\tau_{ref}$" becomes larger than the maximum torque amount "$\tau_{max}$" for the automatic decelerating operation. Namely, the ECU 60 determines whether the vehicle condition reaches at the "$G_{max}$" line.

When the ECU 60 determines at the step S120 that the calculated torque amount "$\tau_{ref}$" becomes larger than the maximum torque amount "$\tau_{max}$" for the automatic decelerating operation, the process goes to a step S121, at which the calculation for the torque amount "$\tau_{ref}$" will be finished, and further goes back to the step S104. In carrying out steps S120, S121 and $S_{104}$, the ECU 60 serves as means for starting an automatic decelerating operation for the vehicle with the predetermined deceleration torque amount, when the calculated deceleration control torque amount becomes larger than the predetermined deceleration torque amount. As a result, the vehicle speed "v" is decreased along the "$G_{max}$" line (FIGS. 5A and 5B).

On the other hand, when the ECU 60 determines at the step S120 that the calculated torque amount "$\tau_{ref}$" is not larger than the maximum torque amount "$\tau_{max}$" for the automatic decelerating operation, the process goes to a step S122, at which the ECU 60 determines whether the required braking torque amount "$\tau_d$" required by the braking operation of the vehicle driver becomes larger than the calculated torque amount "$\tau_{ref}$". In carrying out steps S122, the ECU 60 serves as means for determining whether the braking torque amount becomes larger than the deceleration control torque amount.

When the ECU 60 determines at the step S122 that the required braking torque amount "$\tau_d$" is not larger than the calculated torque amount "$\tau_{ref}$", the process goes back to the step S120.

On the other hand, when the ECU 60 determines at the step S122 that the required braking torque amount "$\tau_d$" is larger than the calculated torque amount "$\tau_{ref}$", the process goes to a step S123, at which the ECU 60 determines whether the distance "d" to the curve starting point has become zero, namely whether the vehicle has reached at the curve starting point or not.

When the ECU 60 determines at the step S123 that the distance "d" to the curve starting point has become zero, the process goes to a step S124, at which the calculation for the torque amount "$\tau_{ref}$" will be finished, and further goes back to the step S101.

On the other hand, when the ECU 60 determines at the step S123 that the distance "d" to the curve starting point has not yet become zero, the process goes to a step S125 at which the ECU 60 determines whether the calculated torque amount "$\tau_{ref}$" is larger than the required braking torque amount "$\tau_d$" required by the braking operation of the vehicle driver. Namely, the ECU 60 determines whether the required braking torque amount "$\tau_d$" has decreased to the calculated torque amount "$\tau_{ref}$" after the ECU 60 had once determined at the step S122 that the required braking torque amount "$\tau_d$" was larger than the calculated torque amount "$\tau_{ref}$". In carrying out step S125, the ECU 60 serves as means for determining whether the braking torque amount becomes lower than the deceleration control torque amount, after the braking torque amount has once become larger than the deceleration control torque amount.

When the ECU 60 determines at the step S125 that the calculated torque amount "$\tau_{ref}$" is not larger than the required braking torque amount "$\tau_d$", the process goes back to the step S123.

On the other hand, when the ECU 60 determines at the step S125 that the calculated torque amount "$\tau_{ref}$" is larger than the required braking torque amount "$\tau_d$", the process goes to a step S126. And at the step S126, the ECU 60 determines whether at least one of the conditions (the above mentioned first and second conditions) is satisfied or not ("$d \leq d_{thr}$" or "$t \leq t_{thr}$").

When the ECU 60 determines at the step S126 that neither of the conditions is satisfied, the process goes to a step S127, at which the calculation for the torque amount "$\tau_{ref}$" will be finished, and further goes back to the step S101.

On the other hand, when the ECU 60 determines at the step S126 that at least one of the first and second conditions is satisfied, the process goes to a step S128, at which the automatic decelerating operation is started with the torque amount "$\tau_{ref}$", which is calculated at the time of the determination of the step S126. In carrying out steps S126 and S128, the ECU 60 serves as means for starting an automatic decelerating operation with the deceleration control torque amount, when the braking torque amount has once become larger than the deceleration control torque amount, and then when the braking torque amount becomes lower than the deceleration control torque amount. As a result, the vehicle speed "v" is decreased along the "$G_{ref}$" line (FIGS. 4A and 4B).

Then, at a step S129, the ECU 60 determines whether the distance "d" to the curve starting point has become zero, namely whether the vehicle has reached at the curve starting point or not.

When the ECU 60 determines at the step S129 that the distance "d" to the curve starting point has become zero, the process goes to a step S130, at which the automatic decelerating operation with the torque amount "$\tau_{ref}$" is terminated. And the process returns to the step S101 after the calculation for the torque amount "$\tau_{ref}$" has been finished at a step S131.

On the other hand, when the ECU 60 determines at the step S129 that the distance "d" to the curve starting point has not yet become zero, the process goes to a step S132, at which the ECU 60 determines whether the required braking torque amount "$\tau_d$" required by the braking operation of the vehicle driver becomes larger than the calculated torque amount "$\tau_{ref}$" for the automatic decelerating operation. Namely, the ECU 60 determines whether the brake override condition has started or not.

When the ECU 60 determines at the step S132 that the required braking torque amount "$\tau_d$" is not larger than the calculated torque amount "$\tau_{ref}$", the process goes back to the step S129. Namely, the automatic decelerating operation with the calculated torque amount "$\tau_{ref}$" is continued until the vehicle reaches at the curve starting point, unless the brake override condition occurs.

On the other hand, when the ECU 60 determines at the step S132 that the required braking torque amount "$\tau_d$" becomes larger than the calculated torque amount "$\tau_{ref}$", the process goes to a step S133, at which the automatic decelerating operation with the torque amount "$\tau_{ref}$" is terminated. Namely, the vehicle decelerating operation is changed to the operation (the normal decelerating operation), in which the vehicle is decelerated with the required braking torque amount "$\tau_d$" required by the braking operation of the vehicle driver.

Then, at a step S134, the ECU 60 determines again whether the distance "d" to the curve starting point has become zero, namely whether the vehicle has reached at the curve starting point or not.

When the ECU 60 determines at the step S134 that the distance "d" to the curve starting point has become zero, the process goes to a step S135, at which the automatic decelerating operation with the torque amount "$\tau_{ref}$" is terminated. And the process returns to the step S101.

On the other hand, when the ECU 60 determines at the step S134 that the distance "d" to the curve starting point has not yet become zero, the process goes to a step S136, at which the ECU 60 determines whether the calculated torque amount "$\tau_{ref}$" is larger than the required braking torque amount "$\tau_d$" required by the braking operation of the vehicle driver. Namely, the ECU 60 determines whether the brake override condition has been terminated or not.

When the ECU 60 determines at the step S136 that the calculated torque amount "$\tau_{ref}$" is not larger than the required braking torque amount "$\tau_d$", the process goes back to the step S134.

On the other hand, when the ECU 60 determines at the step S136 that the calculated torque amount "$\tau_{ref}$" is larger than the required braking torque amount "$\tau_d$", the process goes back to the step S128, in order to start the automatic decelerating operation with the torque amount "$\tau_{ref}$".

As explained above, the vehicle speed control system according to the embodiment of the present invention has the following advantages:

(1) In the case that the brake override occurs during the automatic decelerating operation with the maximum torque amount "$\tau_{max}$", the automatic decelerating operation with the control torque amount "$\tau_{ref}$" is started at such a timing, at which the required braking torque amount "$\tau_d$" becomes thereafter smaller than the control torque amount "$\tau'_{ref}$". Accordingly, even though a sufficient amount of the vehicle deceleration is not carried out by the braking operation after the occurrence of the brake override, the vehicle condition may not return to the "$G_{max}$" line and thereby the vehicle will be decelerated with the control torque amount "$\tau'_{ref}$", which is smaller than the maximum torque amount "$\tau_{max}$". Namely, when compared with a case in which the automatic decelerating operation may not be re-started until the vehicle condition has returned to the "$G_{max}$" line, the automatic decelerating operation can be re-started at an earlier stage in the present embodiment. As a result, the vehicle can be more smoothly decelerated. In addition, the present embodiment hardly gives the uncomfortable feeling to the vehicle driver, because the change of the vehicle deceleration after the brake override occurred can be made smaller.

(2) The automatic decelerating operation with the control torque amount "$\tau_{ref}$" is started, when the braking operation is carried out by the vehicle driver before the automatic decelerating operation starts, and the required braking torque amount "$\tau_d$" by such braking operation has once become larger than the control torque amount "$\tau_{ref}$" for the automatic decelerating operation but the required braking torque amount "$\tau_d$" has become thereafter smaller than the control torque amount "$\tau_{ref}$". The above automatic decelerating operation with the control torque amount "$\tau_{ref}$" is started, subject to a condition that the curve starting point exists closer to the vehicle. Namely, the automatic decelerating operation is carried out in order to maintain the vehicle deceleration condition which is achieved by the braking operation of the vehicle driver, even before the original conditions for starting the automatic decelerating operation are not satisfied. As a result, the vehicle can be likewise decelerated smoothly.

(3) The uncomfortable feeling due to the deceleration is hardly given to the vehicle driver, because the automatic decelerating operation will be started when the required braking torque amount "$\tau_d$" becomes smaller than the control torque amount "$\tau_{ref}$" after the required braking torque amount "$\tau_d$" has once become larger than the control torque amount "$\tau_{ref}$".

(4) In addition, the automatic decelerating operation will be started, subject to the condition that the curve starting point exists closer to the vehicle. Accordingly, such a situation can be avoided, in which the automatic decelerating operation will be started in spite that there is no curve starting point closer to the vehicle.

(5) Furthermore, the automatic decelerating operation will be started so that the vehicle speed "v" is decreased to the target speed "$v_t$", when the ECU determines that the vehicle condition reached at the "$G_{max}$" line, even in the case that the required braking torque amount "$\tau_d$" required by the braking operation carried out before the automatic decelerating operation does not become larger than the control torque amount "$\tau_{ref}$". As a result, the automatic decelerating operation can be started at an appropriate timing, even in the case that the braking operation is carried out before the automatic decelerating operation but the required braking torque amount "$\tau_d$" does not become larger than the control torque amount "$\tau_{ref}$".

The present invention has been explained above with reference to one of the embodiments. However, the present invention may be modified in various ways.

In the above embodiment, the curve starting point is explained as a deceleration point, in which case the curved road detecting portion 12 serves as means for detecting a deceleration point on a road existing ahead of a vehicle. However, any other points than the curve starting point may be used as the deceleration point. For example, a point, at which the speed limit detected by the speed limit detecting portion 40 is changed to a lower speed limit, can be used as the deceleration point, in which case the speed limit detecting portion 40 serves as means for detecting a deceleration point on a road existing ahead of a vehicle. And such amount for the speed limit may be used as the target speed "$v_t$" for the automatic decelerating operation. Alternatively, a starting point for a school zone may be detected as the deceleration point, and the amount for the speed limit (e.g. 20 km/h) for such school zone may be used as the target speed "$v_t$" for the automatic decelerating operation.

In the above explained vehicle speed control system, the determination for starting (and/or terminating) the automatic decelerating operation can be based on either the deceleration torque amount or the decelerating physical amount.

What is claimed is:

1. A vehicle speed control system comprising:
means for detecting a current vehicle position;
means for detecting a deceleration point on a road existing ahead of a vehicle;
means for detecting a current vehicle speed "v";
means for calculating a target vehicle speed "$v_t$" which is to be realized when the vehicle reaches the deceleration point;
means for calculating a deceleration amount "$G_{ref}$", with which the current vehicle speed "v" will be decreased to the target vehicle speed "$v_t$", based on a distance "d" from the current vehicle position to the deceleration point and the current vehicle speed "v";
means for starting an automatic decelerating operation for the vehicle with a predetermined deceleration torque amount "$\tau_{max}$", when the calculated deceleration amount "$G_{ref}$" becomes larger than a predetermined decelerating physical amount "$G_{max}$";
means for terminating the automatic decelerating operation with the predetermined deceleration torque amount "$\tau_{max}$", when braking torque amount "$\tau_d$" required by braking operation of a vehicle driver becomes larger than the predetermined deceleration torque amount "$\tau_{max}$";
means for calculating deceleration control torque amount "$\tau_{ref}$, $\tau'_{ref}$" which corresponds to the deceleration amount "$G_{ref}$"; and
means for starting an automatic decelerating operation with the deceleration control torque amount "$\tau_{ref}$, $\tau'_{ref}$", which is smaller than the predetermined deceleration torque amount "$\tau_{max}$", when the braking torque amount "$\tau_d$" becomes lower than the deceleration control torque amount "$\tau_{ref}$, $\tau'_{ref}$".

2. The vehicle speed control system according to the claim 1, further comprising:
means for determining whether the braking torque amount "$\tau_d$" becomes larger than the deceleration control torque amount "$\tau_{ref}$";
means for determining whether the braking torque amount "$\tau_d$" becomes lower than the deceleration control torque amount "$\tau_{ref}$", after the braking torque amount "$\tau_d$" has once become larger than the deceleration control torque amount "$\tau_{ref}$";
means for starting an automatic decelerating operation with the deceleration control torque amount "$\tau_{ref}$", when the braking torque amount "$\tau_d$" has once become larger than the deceleration control torque amount "$\tau_{ref}$", and then when the braking torque amount "$\tau_d$" becomes lower than the deceleration control torque amount "$\tau_{ref}$",
wherein the above automatic decelerating operation with the deceleration control torque amount "$\tau_{ref}$" is carried out, when the vehicle exists at a position close to the deceleration point.

3. The vehicle speed control system according to the claim 2, further comprising:
means for starting an automatic decelerating operation for the vehicle with the predetermined deceleration torque amount "$\tau_{max}$", when the calculated deceleration control torque amount "$\tau_{ref}$" becomes larger than the predetermined deceleration torque amount "$\tau_{max}$", even in the case the braking torque amount "$\tau_d$" required by the braking operation carried out before the automatic decelerating operation does not become larger than the calculated deceleration control torque amount "$\tau_{ref}$".

4. The vehicle speed control system according to the claim 2, wherein the means, which starts the automatic decelerating operation with the deceleration control torque amount "$\tau_{ref}$", when the braking torque amount "$\tau_d$" has once become larger than the deceleration control torque amount "$\tau_{ref}$", and then when the braking torque amount "$\tau_d$" becomes lower than the deceleration control torque amount "$\tau_{ref}$", determines that the vehicle exists at the position close to the deceleration point in the case that the distance "d" from the current vehicle position to the deceleration point is within a predetermined threshold value "$d_{thr}$".

5. The vehicle speed control system according to the claim 2, wherein
the means, which starts the automatic decelerating operation with the deceleration control torque amount "$\tau_{ref}$", when the braking torque amount "$\tau_d$" has once become larger than the deceleration control torque amount "$\tau_{ref}$", and then when the braking torque amount "$\tau_d$" becomes lower than the deceleration control torque amount "$\tau_{ref}$", determines that the vehicle exists at the position close to the deceleration point,
in the case that a time necessary for the vehicle, in which the deceleration control torque amount "$\tau_{ref}$" would become larger than the predetermined deceleration torque amount "$\tau_{max}$", is within a predetermined threshold value "$t_{thr}$", if the vehicle traveled at a vehicle speed which corresponds to a vehicle speed at a timing when the braking torque amount "$\tau_d$" becomes lower than the deceleration control torque amount "$\tau_{ref}$".

6. The vehicle speed control system according to the claim 1, wherein
a curve starting point of a road is detected as the deceleration starting point.

7. The vehicle speed control system according to the claim 1, wherein
a point of a road, at which a speed limit is changed to a lower value, is detected as the deceleration point.

* * * * *